United States Patent
Gontier et al.

(10) Patent No.: US 11,975,443 B2
(45) Date of Patent: May 7, 2024

(54) METHOD FOR ASSEMBLING A MOTOR VEHICLE HEATING, VENTILATION AND/OR AIR CONDITIONING DEVICE

(71) Applicant: Valeo Systemes Thermiques, Le Mesnil Saint-Denis (FR)

(72) Inventors: Cyril Gontier, Le Mesnil Saint Denis (FR); Alexis Pigeon, Le Mesnil Saint Denis (FR); Yves Rousseau, Le Mesnil Saint Denis (FR); Julien Mikhel, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 0 days.

(21) Appl. No.: 17/433,452

(22) PCT Filed: Feb. 10, 2020

(86) PCT No.: PCT/FR2020/050235
§ 371 (c)(1),
(2) Date: Aug. 24, 2021

(87) PCT Pub. No.: WO2020/174145
PCT Pub. Date: Sep. 3, 2020

(65) Prior Publication Data
US 2022/0168905 A1 Jun. 2, 2022

(30) Foreign Application Priority Data
Feb. 25, 2019 (FR) ...................................... 1901915

(51) Int. Cl.
*B25J 15/00* (2006.01)
*B62D 65/02* (2006.01)

(52) U.S. Cl.
CPC .......... *B25J 15/0038* (2013.01); *B62D 65/02* (2013.01)

(58) Field of Classification Search
CPC ............... B25J 15/0042; B25J 15/0253; B25J 15/0033; B60K 11/04; B60H 1/00857
See application file for complete search history.

(56) References Cited

U.S. PATENT DOCUMENTS 3,583,752 A * 6/1971 Panissidi .............. B25J 17/0208
901/29
4,647,100 A * 3/1987 Lessway ................ B25J 15/028
901/39

(Continued)

FOREIGN PATENT DOCUMENTS

CN 106061689 A 10/2016
CN 107921647 A 4/2018

(Continued)

OTHER PUBLICATIONS

EP0331540B1 Machine Translation (Year: 1989).*

(Continued)

*Primary Examiner* — Michael W Hotchkiss
(74) *Attorney, Agent, or Firm* — Osha Bergman Watanabe & Burton LLP

(57) ABSTRACT

The invention relates to a method for assembling a motor vehicle heating, ventilation and/or air conditioning device, comprising a step of moving at least one part by a manipulator (I) provided with gripping means (2), the gripping means (2) comprising at least one first finger (3) delimiting a triangular shape, said part comprising an element of shape complementary to the trian-gular shape of the finger of the manipulator, termed counter shape, so that, during the movement step, the manipulator (I) grasps the part using the gripping means (2), the counter shape of the part en-gaging with the triangular shape of the finger (3).

6 Claims, 3 Drawing Sheets

(56) References Cited

U.S. PATENT DOCUMENTS

| | | | | |
|---|---|---|---|---|
| 4,699,414 | A * | 10/1987 | Jones | B25J 15/026 294/902 |
| 5,647,399 | A * | 7/1997 | Andersen | F16K 11/22 251/304 |
| 6,431,266 | B1 * | 8/2002 | Han | B60H 1/00857 165/204 |
| 7,517,278 | B2 * | 4/2009 | Sokolofsky | B60H 1/00514 137/865 |
| 7,658,671 | B2 * | 2/2010 | Balzo | B60H 1/00671 137/865 |
| 9,804,607 | B1 * | 10/2017 | Coleman | F28F 21/065 |
| 9,808,936 | B2 * | 11/2017 | Chavan Dafle | B25J 15/0004 |
| 9,821,472 | B2 * | 11/2017 | Saadat | B25J 15/0028 |
| 9,926,015 | B2 * | 3/2018 | Lueschen | B60K 11/04 |
| 11,027,426 | B2 * | 6/2021 | Suzuki | B25J 9/1697 |
| 11,125,310 | B2 * | 9/2021 | Nolta | B60H 1/00857 |
| 2005/0107027 | A1 * | 5/2005 | Kachi | B60H 1/00428 454/156 |
| 2005/0144770 | A1 * | 7/2005 | Sawada | B62D 25/16 29/709 |
| 2007/0187384 | A1 * | 8/2007 | Colette | F24H 3/0429 219/216 |
| 2010/0319182 | A1 * | 12/2010 | Sugimoto | B25J 13/085 29/559 |
| 2011/0150611 | A1 * | 6/2011 | Philippon | G01N 35/028 414/226.02 |
| 2011/0241385 | A1 * | 10/2011 | Baccouche | B62D 21/152 296/203.02 |
| 2011/0284301 | A1 * | 11/2011 | Bui | B60K 11/04 180/68.4 |
| 2012/0034058 | A1 * | 2/2012 | Jin | B25J 15/0042 414/591 |
| 2013/0345848 | A1 * | 12/2013 | Izumi | G05B 15/02 700/114 |
| 2014/0000397 | A1 * | 1/2014 | Nolta, Jr. | F16H 19/001 74/393 |
| 2017/0036354 | A1 * | 2/2017 | Chavan Dafle | B25J 15/0253 |
| 2017/0050316 | A1 * | 2/2017 | Harada | B25J 9/1697 |
| 2017/0341131 | A1 * | 11/2017 | Hayashi | B25B 27/023 |
| 2018/0281176 | A1 * | 10/2018 | Ishizuka | B25J 9/1015 |
| 2018/0281202 | A1 * | 10/2018 | Brudniok | B25J 15/103 |
| 2020/0055197 | A1 * | 2/2020 | Chavan Dafle | B25J 15/0023 |
| 2020/0109015 | A1 * | 4/2020 | Newberg | G01N 35/04 |
| 2020/0269441 | A1 * | 8/2020 | Bernhardt | B65G 49/067 |
| 2021/0197409 | A1 * | 7/2021 | Krüger | B25J 15/0033 |
| 2022/0009107 | A1 * | 1/2022 | Zimmer | H04B 1/06 |

FOREIGN PATENT DOCUMENTS

| | | | | |
|---|---|---|---|---|
| CN | 108687769 | A | | 10/2018 |
| EP | 0331540 | A1 | | 9/1989 |
| EP | 0331540 | B1 | * | 9/1989 ... B60K 11/04 |
| EP | 2103463 | A2 | * | 9/2009 ... B60H 1/00857 |
| JP | 2003072354 | A | * | 3/2003 |
| JP | 3630009 | B2 | | 3/2005 |
| JP | 2018001966 | A | * | 1/2018 |
| WO | WO-2015129026 | A1 | * | 9/2015 ... B25J 15/0042 |

OTHER PUBLICATIONS

JP-2018001966-A Machine Translation (Year: 2018).*
WO-2015129026-A1 Machine Translation (Year: 2015).*
JP-2003072354-A Machine Translation (Year: 2003).*
EP-2103463-A2 Translation (Year: 2009).*
International Search Report and Written Opinion in corresponding International Application No. PCT/FR2020/050235, dated Jun. 5, 2020 (12 pages).
Office Action issued in counterpart Chinese Patent Application No. CN 202080015791.9 issued Feb. 5, 2024 (36 pages).

* cited by examiner

METHOD FOR ASSEMBLING A MOTOR VEHICLE HEATING, VENTILATION AND/OR AIR CONDITIONING DEVICE

The invention relates to a method for assembling a motor vehicle heating, ventilation and/or air conditioning device.

A ventilation, heating and/or air conditioning device of this type ensures the regulation of the temperature of a flow of air which is intended to be supplied to the passenger space of the vehicle.

At present, devices for ventilation, heating and/or air conditioning are mostly assembled manually by an operator who secures each of the elements which constitute the devices, one after another, on a production line.

The objective of the invention is to increase the productivity of the production lines by simplifying the gripping and assembly solutions.

For this purpose, the subject of the invention is a method for assembling a motor vehicle heating, ventilation and/or air conditioning device, comprising a step of displacement of at least one part by a manipulator, for example a robot, provided with gripping means, the gripping means comprising at least one first finger delimiting a triangular form, said part comprising an element with a form complementary to the triangular form of the finger of the manipulator, known as the counter-form, such that, during the displacement step, the manipulator seizes the part by means of the gripping means, with the counter-form of the part cooperating with the triangular form of the finger.

Thanks to the present invention, the manipulator permits automation of assembly of the device, since it seizes, transports and mounts each element robustly and repeatably, while taking into account initial laying dispersions.

According to another characteristic of the invention, the gripping means of the manipulator comprise a second finger, and, when the manipulator seizes the part, the second finger cooperates with another element of the part.

According to another characteristic of the invention, when the manipulator seizes the part, the part pivots or translates in order to reach a specific position, known as the repeatable position, before assembly.

According to another characteristic of the invention, the manipulator comprises a second finger with a cylindrical form or a flat form.

According to another characteristic of the invention, the fingers of the manipulator extend parallel to a direction, known as the longitudinal direction, and the part pivots according to an axis parallel to the longitudinal direction.

The invention also relates to a manipulator for implementation of the method for assembling a motor vehicle heating, ventilation and/or air conditioning device as previously described, comprising gripping means provided with at least one finger delimiting a triangular form configured to cooperate with a complementary form, known as the counter-form, of an element of a part to be assembled in said heating, ventilation and/or air conditioning device.

According to another characteristic of the invention, the first and second fingers extend parallel to a direction, known as the longitudinal direction.

According to another characteristic of the invention, the triangular form is a recess.

According to another characteristic of the invention, the triangular form is a protuberance.

In other words, the triangular form can be arranged on the finger in the form of a recess in the form of a triangle, and in this case, the part with the counter-form will be in the form of a protuberance with a triangular form with a form complementary to the triangular form present on the finger. It will be appreciated that the invention relates to the inverse configuration, where the triangular form can be arranged on the finger in the form of a protuberance in the form of a triangle, and, in this case, the part with the counter-form will be in the form of a recess with a triangular form with a form complementary to the triangular form present on the finger.

The invention also relates to a part for a motor vehicle heating, ventilation and/or air conditioning device, which is designed for implementation of the assembly method as previously described, comprising an element with a form complementary to a triangular form of a finger of the manipulator, known as the counter-form.

According to another characteristic of the invention, the triangular counter-form projects from a component of the part.

BRIEF DESCRIPTION OF THE DRAWINGS

Other characteristics, details and advantages of the invention will become apparent upon reading the detailed description below, and upon analyzing the appended drawings, in which.

DESCRIPTION OF EMBODIMENTS

Figure 10:
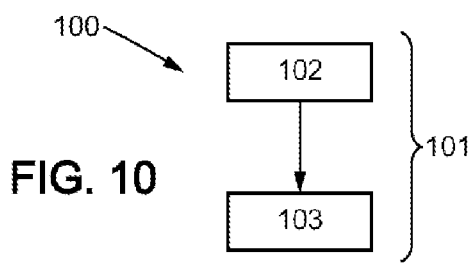
FIG. 10 illustrates a timing diagram of a method for assembling a heating, ventilation and/or air conditioning device according to the present invention.

The invention relates to a method for assembling a motor vehicle heating, ventilation and/or air conditioning device with the reference 100 in FIG. 10.

The invention also relates to a manipulator, which can also be described as a gripper, or also, according to a given embodiment, a robot, and a part, which are designed to cooperate together such as to implement the method 100.

The manipulator has the reference 1 in the figures, whereas the part has the reference 10.

As illustrated in FIG. 10, the method 100 comprises a step 101 of displacement of at least one part by the manipulator 1.

The step of displacement 101 comprises a gripping step 102, during which the manipulator 1 seizes the part 10, as will be described subsequently.

The step of displacement 101 also comprises a step 103 of transporting the part 10.

The manipulator 1 is now described.

As can be seen in FIGS. 1 to 4, the manipulator 1 comprises gripping means 2 which are provided with at least one finger 3 delimiting a form with a triangular cross-section.

Figure 1:
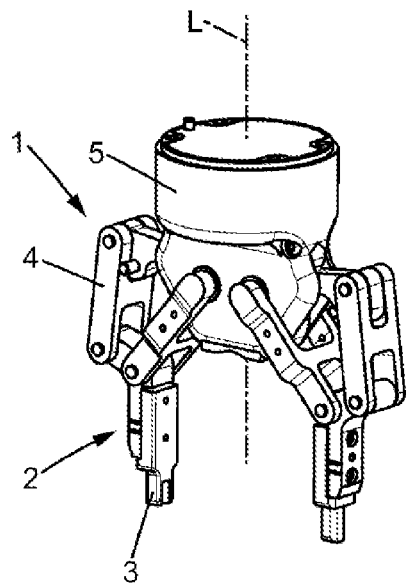
FIG. 1 illustrates a view in perspective of a manipulator according to a first embodiment of the present invention.
Figure 3:
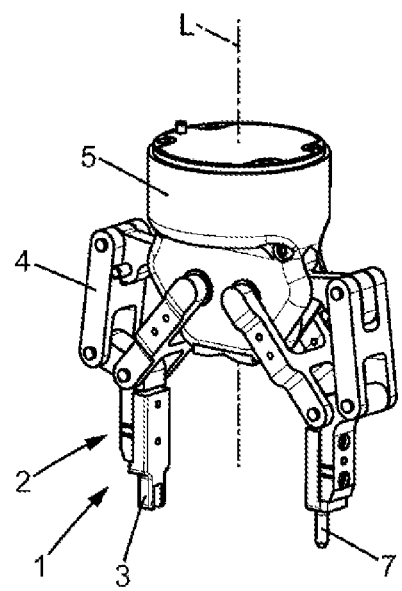
FIG. 3 illustrates a view in perspective of a manipulator according to a second embodiment of the present invention.

As illustrated in FIGS. 1 and 3, the finger 3 forms a free end of an articulated arm 4 of the manipulator 1, which is fitted on a body 5 of the manipulator 1.

The triangular form of the finger 3 is configured to cooperate with a complementary form, known as the counter-form, of the part 10, as will be described subsequently.

This triangular form makes it possible to make up for a very large angular dispersion of initial positioning of the part 10, as will be explained in relation with FIGS. 8 and 9.

Figure 2:
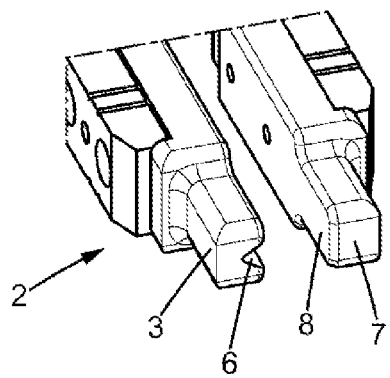
FIG. 2 illustrates a detailed view of FIG. 1.
Figure 4:
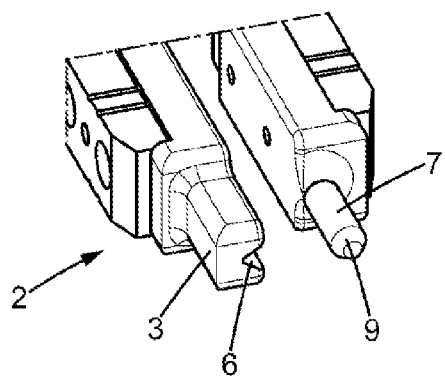
FIG. 4 illustrates a detailed view of FIG. 1.

As can be seen in particular in FIGS. 2 and 4, the triangular form is a concave triangular prism, constituted by a recess with a triangular cross-section 6 in the arm 3.

The means 2 for gripping the manipulator 1 comprise a second finger 7 with a flat form (FIGS. 1 and 2) or a cylindrical form (FIGS. 3 and 4).

The assembly of the first finger 3 and the second finger 7 form a gripper of the manipulator 1.

Advantageously, the first finger 3 and the second finger 7 extend parallel to a direction, known as the longitudinal direction, indicated as L in the figures.

In FIG. 2, a flat wall 8 of the second finger 7 of the manipulator 1 faces the triangular recess 6 of the first finger 3. The flat wall 8 extends on a plane containing the longitudinal direction L.

In FIG. 4, the cylindrical form of the finger 7 faces the triangular recess 6 of the first finger 3. The cylindrical form is constituted by a straight cylinder 9, a longitudinal axis of which extends parallel to the longitudinal direction L.

As illustrated in FIGS. 1 to 4, the triangular recess 6 is arranged at the end of the first finger 3, with positioning of this type permitting easier gripping of the part.

As illustrated in FIGS. 1 to 4, the first finger 3 and the second finger 7 have different forms, in other words, the first and second fingers are not identical, i.e. they do not have an identical form. In other words, according to FIGS. 1 to 4, the first finger 3 comprises a triangular recess 6, whereas the second finger 7 does not have a recess of this type.

The coupling of the triangular recess 6 of the finger 3 to the either cylindrical or flat form of the finger 7 ensures that the manipulator 1 can seize and transport any type of part 10.

According to the invention, the gripping fingers can also seize other parts which would not have the counter-forms in the form of a triangle, such as parts with flat surfaces.

The part 10 is now described.

As already indicated, the part 10 comprises a counter-form 11 which is designed to cooperate with the first finger 3 of the manipulator 1.

Figure 5:
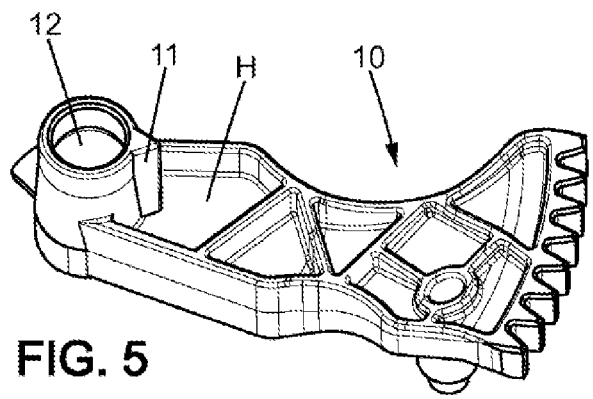
FIG. 5 illustrates a view in perspective of a part of a heating, ventilation and/or air conditioning device which is designed to be seized and displaced by the manipulator in FIG. 1 or the manipulator in FIG. 3.

As can be seen in FIG. 5, the counter-form 11 has a triangular cross-section, the dimensions of which coincide with that of the recess 6 of the first finger 3 of the manipulator 1, such that, when the manipulator 1 seizes the part 10, the counter-form 11 is perfectly inserted in the recess 6.

The counter-form 11 ensures that, irrespective of its form, the part 10 can be seized by the manipulator 1.

In FIG. 5, the counter-form 11 projects from a hollow cylinder 12 of the part 10. It will be appreciated that the invention is not limited to this configuration, and the counter-form 10 can project from another part of the part 10, preferably provided that the part in question is not functional.

Preferably, the counter-form 11 has a height which is sufficient for the part 10 to be able to be supported by the manipulator 1, for example a height H which is 5 mm or more.

Figure 6:
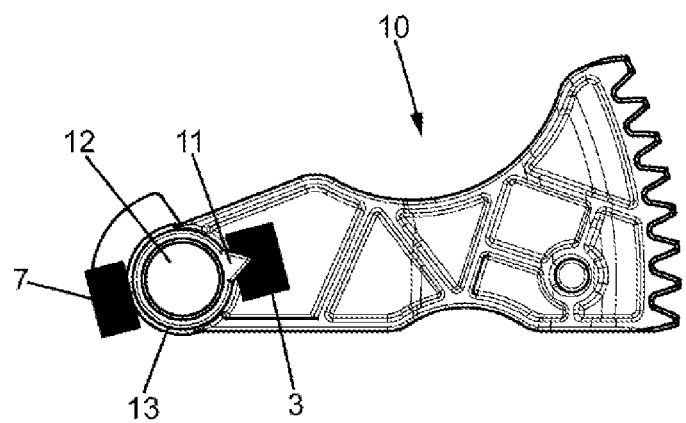
FIG. 6 illustrates a view from above of the part in FIG. 5 in the position in which it is seized by the manipulator in FIG. 1.
Figure 7:
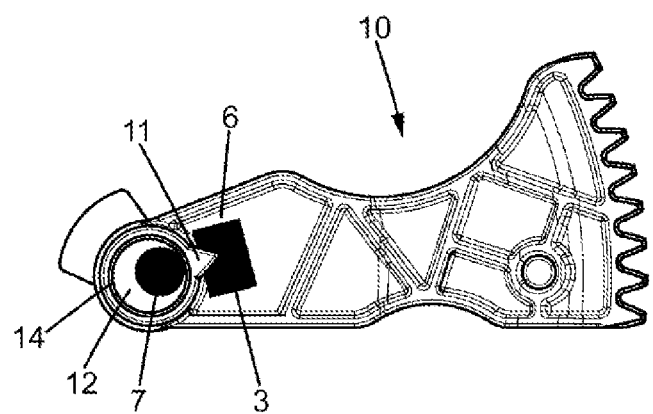
FIG. 7 illustrates a view from above of the part in FIG. 5 in the position in which it is seized by the manipulator in FIG. 3.

A position for gripping of the part 10 is illustrated in FIGS. 6 and 7.

In FIGS. 6 and 7, the counter-form 11 is inserted in the recess 6 of the finger 3.

In FIG. 6, the flat wall 8 of the finger 7 is placed against an outer wall 13 of the cylinder 12, on the exterior of the cylinder 11.

In FIG. 7, the cylinder 9 of the finger 7 is placed against an inner wall 14 of the cylinder 12, in the interior of the cylinder 12.

Thus, during the gripping step 102, the gripping means 2 which are formed by the fingers 3 and 7 seize the part 10 firmly, with the recess 6 cooperating with the counter-form 11.

Depending on the initial position in which the part 10 is located before being seized by the manipulator 1, the part 10 pivots according to an axis parallel to the longitudinal direction L during the gripping step 102, in order to reach a specific position, known as the repeatable position, before assembly.

Thus, the manipulator 1 can seize and transport the part 10 even if the initial position thereof is different from the repeatable position, in order to position the part 10 in the repeatable position.

Figure 8:
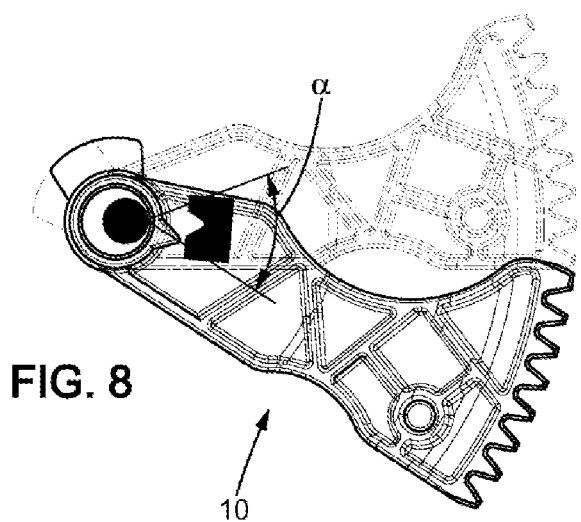
FIG. 8 illustrates an angular dispersion of positioning of the part in FIG. 5 in the position in which it is seized by the manipulator in FIG. 3.

FIG. 8 illustrates the two end initial positions A and B which the part 10 can occupy, and in which it can be seized by the manipulator 10.

An angle α between the positions A and B defines the angular dispersion permitted by the method 100.

Between the positions A and B (included) the manipulator 1 can self-center the part 10 in order to reach the repeatable position before assembly.

Figure 9:
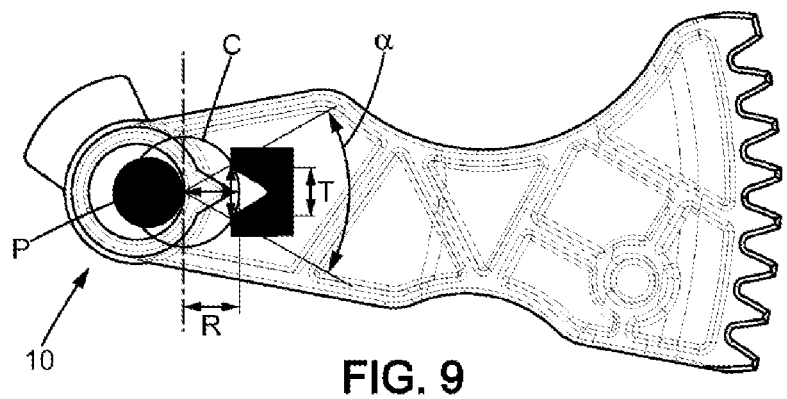
FIG. 9 illustrates a view from above of the part in FIG. 5 for calculation of the angular dispersion of FIG. 8.

The angle α depends on a parameter R and a parameter T illustrated in FIG. 9.

The parameter R is the distance between a point of contact P and the end of the triangle of the part to be seized. The point of contact P is the distance between the part 10 and the second finger 7 of the manipulator 1.

The parameter T is the length of the base B of the triangle of the recess 6.

The angle α is written according to the following equation $$\alpha = 2\sin^{-1}\left(\frac{T}{2R}\right) \quad \text{[MATH 1]}$$

Contrary to the prior art, the initial positioning of the part 10 is less constraining thanks to the association of the manipulator 10 and the counter-form 11, which ensures that the assembly process 100 can take place despite imperfect positioning of the part 10.

The method according to the present invention makes it possible to increase the productivity of the production lines, since it adapts each part 10 to be fitted of a motor vehicle heating, ventilation and/or air conditioning device, and thus automates the entire assembly of the device.

The invention claimed is:

1. A method for assembling a motor vehicle heating, ventilation and/or air conditioning device, comprising:
   displacement of a part by a manipulator provided with gripping means, the gripping means comprising at least one first finger extending in a first direction towards a fingertip of the first finger, wherein the first finger comprises a recess with a triangular cross section extending from the fingertip along the first direction;

wherein the part is elongated in a direction and forms a sectional gear, and wherein the part comprises:
- a toothed section of the sectional gear disposed, at a first end in the direction, on the part,
- a hollow portion disposed, at a second end opposite to the first end in the direction, on the part, and,
- a single counter-form with a triangular cross section which dimensions coincide with that of the recess of the first finger of the manipulator, the single counter-form disposed on an outer wall of the hollow portion with the single counter-form protruding from the hollow portion towards the toothed section and within a radius a curvature of the toothed section, such that, during the displacement, the manipulator seizes the part by the gripping means, with the form of the part cooperating with the triangular cross section of the finger.

2. The assembly method as claimed in claim 1, the gripping means of the manipulator comprising a second finger, and wherein, when the manipulator seizes the part, the second finger cooperates with an element of the at least one part.

3. The assembly method as claimed in claim 2, wherein, when the manipulator seizes the part pivots or translates in order to reach a specific position, known as a repeatable position, before assembly.

4. The assembly method as claimed in claim 3, wherein, with the fingers of the manipulator extending parallel to the first direction, the part pivots according to an axis parallel to a longitudinal direction.

5. The assembly method as claimed in claim 2, wherein the second finger has a cylindrical form or a flat form.

6. The assembly method as claimed in claim 5, wherein the first and second fingers extend parallel to a longitudinal direction.

\* \* \* \* \*